(12) United States Patent
Dewet-Smith et al.

(10) Patent No.: US 9,051,199 B2
(45) Date of Patent: Jun. 9, 2015

(54) PROCESS FOR MELTING AND REFINING SODA-LIME GLASS

(75) Inventors: Dawid Dewet-Smith, Perrysburg, OH (US); Carl L. Fayerweather, Maumee, OH (US); Brett E. Hixson, Adrian, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 177 days.

(21) Appl. No.: 13/034,154

(22) Filed: Feb. 24, 2011

(65) Prior Publication Data

US 2012/0216574 A1  Aug. 30, 2012

(51) Int. Cl.
  C03B 3/02   (2006.01)
  C03C 1/02   (2006.01)
  C03B 5/225  (2006.01)

(52) U.S. Cl.
  CPC . C03B 3/023 (2013.01); C03B 3/02 (2013.01); C03B 5/2252 (2013.01); C03C 1/026 (2013.01)

(58) Field of Classification Search
  CPC ............ C03B 3/02; C03B 3/023; C03C 1/026
  USPC ........................................................ 65/134.1
  See application file for complete search history.

(56) References Cited

U.S. PATENT DOCUMENTS

| 2,220,750 | A | * | 11/1940 | Bair et al. .......................... 65/31 |
| 2,239,880 | A | * | 4/1941 | Curll, Jr. ....................... 423/334 |
| 3,682,666 | A | * | 8/1972 | Lacourrege ..................... 501/29 |
| 3,967,934 | A |   | 7/1976 | Seitz et al. |
| 4,303,487 | A |   | 12/1981 | Carlin et al. |
| 4,920,080 | A |   | 4/1990 | Demarest, Jr. |
| 5,004,706 | A |   | 4/1991 | Dickinson |
| 5,395,806 | A |   | 3/1995 | Adams, Jr. et al. |
| 6,287,378 | B1 |  | 9/2001 | Fairchild et al. |
| 6,883,349 | B1 |  | 4/2005 | Jeanvoine |
| 2006/0101855 | A1 | | 5/2006 | Pita-Szczesniewski |
| 2007/0225145 | A1 | | 9/2007 | Bauer et al. |
| 2007/0251275 | A1 | | 11/2007 | Bauer et al. |

FOREIGN PATENT DOCUMENTS

| EP | 0355618 A2 | 2/1990 |
| EP | 2133315 A1 | 12/2009 |

OTHER PUBLICATIONS

PPG Industries, "A Historical Look at Glass", Published Jun. 1, 2000, http://glasslinks.com/newsinfo/histppg.htm, Accessed Jul. 25, 2012.*
Francis Herbert Clews and Hugh Vernon Thompson, "The Interaction of Sodium Chloride and Silica", Journal of the Chemical Society Transactions, Jan. 1, 1922, pp. 1442-1448.*

* cited by examiner

*Primary Examiner* — Cynthia Szewczyk

(57) ABSTRACT

A process for making soda-lime glass includes calcining calcium carbonate in solid phase and at elevated temperature to form calcium oxide in solid phase and carbon dioxide gas. Sodium silicate glass is formed and refined separately in liquid phase. The solid phase calcium oxide is dissolved in the refined liquid phase sodium silicate glass to form a soda-lime glass melt. Formation of sodium silicate glass as an intermediate product before mixing with calcium oxide has the advantage of promoting release of gaseous reaction products from the sodium silicate glass during the refining step due at least in part to the relatively low viscosity of the sodium silicate glass. One or more steps in the process can be carried out under reduced pressure to promote release of gases and to reduce bubble formation.

31 Claims, 1 Drawing Sheet

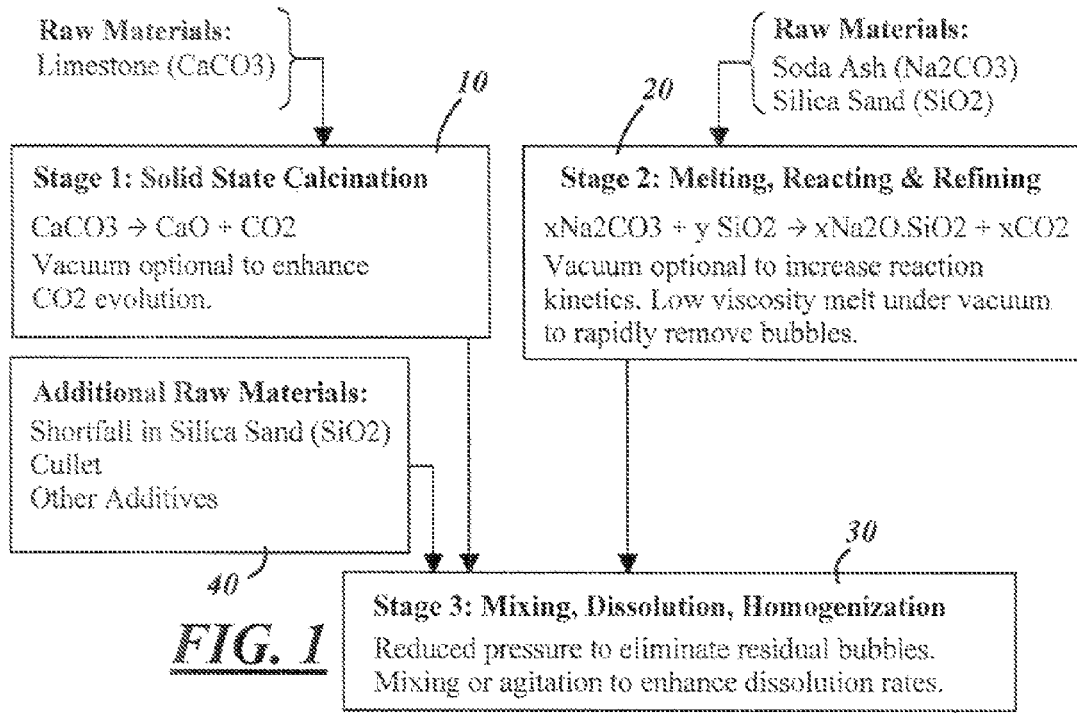
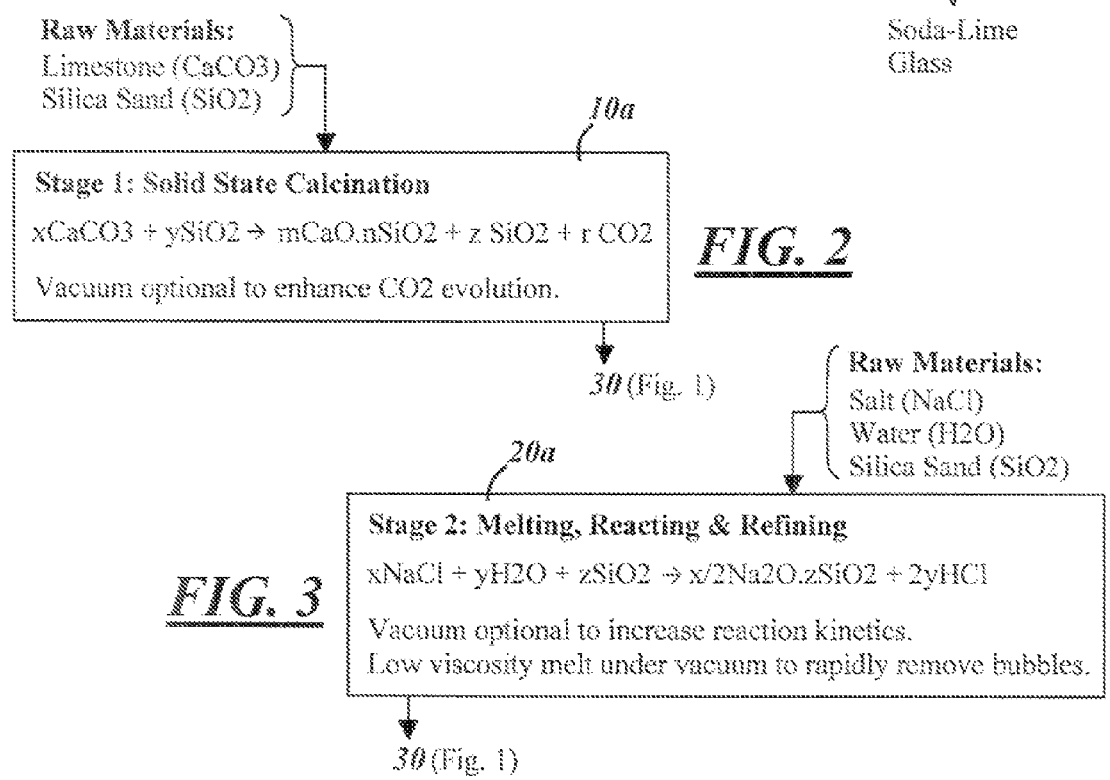

PROCESS FOR MELTING AND REFINING SODA-LIME GLASS

The present disclosure relates to a process for melting and refining soda-lime glass, and particularly to such a process that employs sodium silicate glass as an intermediate product.

BACKGROUND AND SUMMARY OF THE DISCLOSURE

Soda-lime glass, also called soda-lime-silica glass, is prevalent in the manufacture of glass containers and other glass products. Formation of the raw glass melt typically involves mixing the various glass-forming components at elevated temperature. The glass typically has a residence time in a furnace on the order of twenty-four hours to refine the glass by driving off gases and dissolving solids. The gases must be driven off ultimately to produce a solidified glass product without entrained gas bubbles; the process of removing bubbles in molten glass is called "refining." In addition to being undesirably slow, this in-furnace process involves a large amount of space and high energy input.

A general object of the present disclosure is to provide a process for making soda-lime glass, which is more rapid and requires less energy input than conventional processes.

The present disclosure embodies a number of aspects that can be implemented separately from or in combination with each other.

A process for making soda-lime glass, in accordance with one aspect of the present disclosure, includes (a) forming sodium silicate glass in liquid phase and in the absence of water while releasing gaseous reaction products, and (b) mixing the sodium silicate glass reaction product of step (a) with other materials to form a soda-lime glass melt. The low viscosity of the molten sodium silicate glass (relative to or as compared with soda-lime glass at the same temperature) enables and promotes release of gaseous reaction products such as carbon dioxide.

A process for making soda-lime glass, in accordance with another aspect of the disclosure, includes calcining calcium carbonate in solid phase and at elevated temperature to form calcium oxide and release gases such as carbon dioxide. Sodium silicate glass is formed separately in liquid phase while releasing gaseous reaction products. The calcined calcium carbonate and sodium silicate glass intermediate products are mixed to form a soda-lime glass melt. Formation of sodium silicate glass as an intermediate product before mixing with the calcium oxide has the advantage of promoting release of gaseous reaction products in the sodium silicate glass due at least in part to the low viscosity of the sodium silicate glass (relative to or as compared with soda-lime glass at the same temperature). Thus, the calcium oxide intermediate product and/or the sodium silicate glass intermediate product is at least partially if not entirely refined, and at least partially if not entirely free of gases and gas bubbles, prior to the mixing stage. This greatly reduces the time and energy required for the final mixing stage to produce the soda-lime glass melt. The calcination step and/or the sodium silicate glass-forming step and/or the final mixing step can be carried out under reduced pressure further to promote release of gases and reduce bubble formation.

In one embodiment, the sodium silicate glass, is formed by melting soda ash in the presence of silica, releasing carbon dioxide gas. In another embodiment, the sodium silicate glass is formed by melting sodium chloride in the presence of silica and steam to form the sodium silicate and release hydrogen chloride gas.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a block diagram of a basic process for melting and refining soda-lime glass in accordance with one exemplary embodiment of the disclosure; and FIGS. 2 and 3 are functional block diagrams of modifications to respective stages in the process of FIG. 1.

DETAILED DESCRIPTION OF PREFERRED EMBODIMENTS

FIG. 1 illustrates a process for making soda-lime glass, also called soda-lime-silica glass, in accordance with one exemplary embodiment of the disclosure. A first stage 10 of the process involves solid state (solid phase) calcination of raw materials. In one embodiment, calcium carbonate ($CaCO_3$) is input, such as in the form of limestone, and heated to release carbon dioxide ($CO_2$). This step may be carried out at a temperature of about 800° C. to about 1300° C. In a second embodiment 10a in FIG. 2, the solubility of the calcined product in the final mixing stage can be improved by calcination in the presence of silica ($SiO_2$) to form at least some calcium silicate ($CaO$—$SiO_2$), which is more readily dissolved at the mixing stage. This calcination stage 10 or 10a can be carried out at reduced pressure (vacuum) to enhance release of carbon dioxide.

A second stage of the process involves melting, reacting and refining input materials and production of sodium silicate glass in liquid (molten) phase. This sodium silicate glass is a "dry" glass in the sense that it is not dissolved in water. In one embodiment 20 in FIG. 1, soda ash ($Na_2CO_3$) is blended with silica at elevated temperature to produce sodium silicate glass ($Na_2O$—$SiO_2$) and release carbon dioxide. The soda ash and silica can be in a molar ration of about 1:1 to about 1:5. In an alternative embodiment 20a in FIG. 3, the sodium silicate glass is formed by reaction of sodium chloride (NaCl) with steam ($H_2O$) and silica ($SiO_2$) to produce the sodium silicate glass and release hydrogen chloride (HCl) gas. This stage 20 or 20a preferably takes place at an elevated temperature, such as about 900° C. to 1700° C. This stage can be carried out at low pressure (vacuum) to promote release of carbon dioxide or hydrogen chloride gaseous products. The relatively low viscosity of the sodium silicate glass (i.e., relative to or as compared with the viscosity of typical soda-lime glass at the same temperature above the glass transition temperature of the sodium silicate glass, at which the sodium silicate glass is in liquid phase, and in the absence of water) readily promotes and permits release of gaseous reaction products, without formation of bubbles.

At a third stage 30 of FIG. 1, the calcium oxide product of stage 10 or 10a is mixed with the liquid product of stage 20 or 20a. The relatively low viscosity of the sodium silicate glass product of stage 20 or 20a promotes mixing, dissolution, homogenization and release of any remaining gases in stage 30. For example, the already-molten sodium silicate glass may have a temperature below 1500 C when the higher melting point components (CaO melts at 2572 C, and SiO2 transitions to glass (melts) at 1600 to 1725 C) are mixed and dissolved therein. Stage 30 can include mixing, for example by mechanical agitation such as stirring, to promote dissolution and homogenization of the mixture. Stage 30 can be carried out at reduced pressure (vacuum) to promote release of gases. This stage can be carried out at a temperature greater than about 900° C. Additional raw materials 40 can be added at stage 30, such as addition of silica to achieve the desired silica level in the glass melt and/or other additives such as colorants and/or calcium oxide (CaO) and/or cullet (recycled) glasses and/or other minor ingredients.

Although stages 10 and 10*a* are illustrated in FIGS. 1 and 2 and discussed above as alternatives, these stages can be combined if desired. Likewise, stages 20 and 20*a* can be alternatives or combined. It also will be appreciated that, although "stages" are discussed and shown in the drawings, the process of the disclosure preferably is a continuous process with stages 10 and 20, for example, taking place simultaneously and together feeding stage 30 at rates that supply a continuous output from stage 30. In other words, there preferably is a continuous infeed of raw materials to stages 10 and 20, for example, continuous feeds of intermediate reaction products from stages 10 and 20 to stage 30, continuous infeed of additional raw materials at stage 40 if needed, and a continuous outfeed of soda-lime glass from stage 30 to further glass manufacturing stages.

The entire process illustrated in the drawings can be carried out in about three to four hours, as compared with the twenty-four hour residence time typically needed in the prior art, and at a theoretical estimated energy input of about 1.5 megajoules per ton versus an estimated theoretical energy of 2.2 megajoules per ton typical of the prior art.

There thus has been disclosed a process for making soda-lime glass that fully achieves all of the objects and aims previously set forth. The disclosure has been presented in conjunction with presently preferred embodiments, and alternatives and modifications have been discussed. Other alternatives and modifications readily will suggest themselves to persons of ordinary skill in the art in view of the foregoing description. The disclosure is intended to embrace all such modifications and variations as fall within the spirit and broad scope of the appended claims.

The invention claimed is:

1. A process for making soda-lime glass, which includes the steps of:
   (a) calcining calcium carbonate ($CaCO_3$) at an elevated temperature sufficient to produce carbon dioxide ($CO_2$) gas and calcium oxide (CaO) in solid phase,
   (b) reacting a sodium-containing compound with silica ($SiO_2$) to produce sodium silicate glass ($Na_2SiO_3$) in liquid phase,
   (c) refining the liquid phase sodium silicate glass product of said step (b), and
   (d) after completion of said step (c), dissolving the solid phase calcium oxide product of said step (a) in the refined liquid phase sodium silicate glass product of said step (c) to produce a refined liquid phase soda-lime glass melt.

2. The process set forth in claim 1 wherein said steps (a) is carried out under reduced pressure to promote release of carbon dioxide ($CO_2$) gas.

3. The process set forth in claim 1 wherein the liquid phase sodium silicate glass product of said step (c) has a temperature of less than 1500° C. when the solid phase calcium oxide product of said step (a) is dissolved therein in said step (d).

4. The process set forth in claim 1 wherein said step (a) includes calcining the calcium carbonate in the presence of silica ($SiO_2$) to produce carbon dioxide ($CO_2$) gas, calcium oxide (CaO) in solid phase, and calcium silicate (CaO—$SiO_2$) in solid phase.

5. The process set forth in claim 4 wherein said step (d) includes dissolving the solid phase calcium oxide and the solid phase calcium silicate products of said step (a) in the refined liquid phase sodium silicate glass product of said step (c) to produce the soda-lime glass melt.

6. The process set forth in claim 1 wherein said step (a) includes heating the calcium carbonate at a temperature in the range of about 800° C. to about 1300° C.

7. The process set forth in claim 1 wherein said step (d) includes dissolving silica ($SiO_2$) in the refined liquid phase sodium silicate glass product of said step (c).

8. The process set forth in claim 7 wherein the soda-lime glass melt produced in said step (d) has a higher concentration of silica ($SiO_2$) than the sodium silicate glass product of said step (c).

9. The process set forth in claim 1 wherein said step (d) includes dissolving cullet glass in the refined liquid phase sodium silicate glass product of said step (c).

10. The process set forth in claim 1 wherein said step (d) includes mixing to promote dissolution of the solid phase calcium oxide product of said step (a) in the liquid phase sodium silicate glass product of said step (c).

11. The process set forth in claim 1 wherein the refined liquid phase sodium silicate glass product of said step (c) is heated to a temperature greater than 900° C. during said step (d).

12. The process set forth in claim 1 wherein said step (d) includes mixing the solid phase calcium oxide product of said step (a) into the refined liquid phase sodium silicate glass product of said step (c) for 3 to 4 hours to produce the refined liquid phase soda-lime glass melt.

13. The process set forth in claim 1 wherein the sodium silicate glass product of said step (c) has a relatively low viscosity at a temperature in the range of 900° C. to 1700° C., and the soda-lime glass melt produced in said step (d) has a higher viscosity than the sodium silicate glass product of said step (c) at the same temperature.

14. The process set forth in claim 1 wherein said step (c) includes removing a gaseous reaction product from the liquid phase sodium silicate glass product of said step (b).

15. A process for making soda-lime glass, which includes the steps of:
   (a) heating calcium carbonate ($CaCO_3$) at an elevated temperature sufficient to produce carbon dioxide ($CO_2$) gas and calcium oxide (CaO) in solid phase,
   (b) melting and reacting sodium chloride (NaCl) with silica ($SiO_2$) and steam ($H_2O$) to produce hydrogen chloride (HCl) gas and sodium silicate glass ($Na_2O$—$SiO_2$) in liquid phase,
   (c) refining the liquid phase sodium silicate glass product of said step (b), and
   (d) after completion of said step (c), dissolving the solid phase calcium oxide product of said step (a) in the refined liquid phase sodium silicate glass product of said step (c) to produce refined soda-lime glass in liquid phase.

16. The process set forth in claim 15 wherein said steps (a), (b) and (c) are performed separately from each other but at substantially the same time.

17. The process set forth in claim 15 wherein the sodium silicate glass product of said step (c) has a relatively low viscosity at a temperature in the range of 900° C. to 1700° C., and the soda-lime glass produced in said step (d) has a higher viscosity than the sodium silicate glass product of said step (c) at the same temperature.

18. The process set forth in claim 15 wherein said step (b) does not produce carbon dioxide ($CO_2$) gas as a reaction product.

19. The process set forth in claim 15 wherein said step (a) is carried out under reduced pressure to promote release of carbon dioxide ($CO_2$) gas.

20. The process set forth in claim 15 wherein said step (c) is carried out under reduced pressure to promote release of hydrogen chloride (HCl) gas from the liquid phase sodium silicate glass product of said step (b).

21. The process set forth in claim 15 wherein said step (a) includes heating the calcium carbonate at a temperature in the range of about 800° C. to about 1300° C.

22. The process set forth in claim 15 wherein said step (b) is performed at a temperature in the range of about 900° C. to about 1700° C.

23. The process set forth in claim 15 wherein said step (d) includes heating the refined liquid phase sodium silicate glass product of said step (c) to a temperature greater than 900° C.

24. The process set forth in claim 15 wherein step (d) includes dissolving silica ($SiO_2$) in the refined liquid phase sodium silicate glass product of said step (c) such that the soda-lime glass produced in said step (d) has a higher concentration of silica ($SiO_2$) than the sodium silicate glass product of said step (c).

25. The process set forth in claim 15 wherein said step (c) includes removing hydrogen chloride (HCl) gas from the liquid phase sodium silicate glass product of said step (b).

26. A process for making soda-lime glass, which includes the steps of:
(a) heating calcium carbonate ($CaCO_3$) at an elevated temperature sufficient to produce carbon dioxide ($CO_2$) gas and calcium oxide (CaO) in solid phase,
(b) melting and reacting soda ash ($Na_2CO_3$) and silica ($SiO_2$) with each other, but without addition of water ($H_2O$), to produce carbon dioxide ($CO_2$) gas and sodium silicate glass ($Na_2O$—$SiO_2$) in liquid phase,
(c) refining the liquid phase sodium silicate glass product of said step (b), and
(d) after completion of said step (c), dissolving the solid phase calcium oxide product of said step (a) in the refined liquid phase sodium silicate glass product of said step (c) to produce refined soda-lime glass in liquid phase.

27. The process set forth in claim 26 wherein said steps (a), (b) and (c) are performed separately from each other but at substantially the same time.

28. The process set forth in claim 26 wherein said step (b) includes reacting soda ash ($Na_2CO_3$) and silica ($SiO_2$) with each other at a molar ratio of about 1:1 to about 1:5.

29. The process set forth in claim 26 wherein the sodium silicate glass product of said step (c) has a relatively low viscosity at a temperature in the range of 900° C. to 1700° C., and the soda-lime glass produced in said step (d) has a higher viscosity than the sodium silicate glass product of said step (c) at the same temperature.

30. The process set forth in claim 26 wherein said step (d) includes dissolving silica ($SiO_2$) in the refined liquid phase sodium silicate glass product of said step (c) such that the soda-lime glass produced in said step (d) has a higher concentration of silica than the sodium silicate glass product of said step (c).

31. The process set forth in claim 26 wherein said step (c) includes removing carbon dioxide ($CO_2$) gas from the liquid phase sodium silicate glass product of said step (b).

\* \* \* \* \*